United States Patent [19]

Korenek

[11] Patent Number: 4,756,259

[45] Date of Patent: Jul. 12, 1988

[54] METHOD FOR TRANSPLANTING LARGE TREES

[76] Inventor: Albert H. Korenek, P.O. Box 45915, Houston, Tex. 77245

[21] Appl. No.: 890,870

[22] Filed: Jul. 28, 1986

[51] Int. Cl.[4] .............................................. H01G 23/04
[52] U.S. Cl. ......................................... 111/2; 37/2 R; 37/195
[58] Field of Search ................... 37/2 R, 195; 414/23; 47/76; 111/2

[56] References Cited

U.S. PATENT DOCUMENTS 1,976,160 10/1934 Coplen ................................. 37/2 R
3,040,456 6/1962 Pearce .................................. 37/2 R

FOREIGN PATENT DOCUMENTS 7614170 6/1978 Netherlands .......................... 37/2 R
14100 4/1852 United Kingdom .................. 37/2 R
505402 5/1976 U.S.S.R. ................................ 37/2 R
651094 3/1979 U.S.S.R. ................................ 37/2 R Primary Examiner—Clifford D. Crowder
Attorney, Agent, or Firm—Vaden, Eickenroht, Thompson & Boulware

[57] ABSTRACT

A method of and apparatus for moving large trees is disclosed that includes digging a trench around the tree, enclosing the soil inside the trench in the walls of a container, and sequentially removing sections of the supporting soil under the tree between trenches on opposite sides and replacing the sections with support members that form the bottom of the container. A vehicle for lifting the container upwardly until it clears the ground for moving the trees on the construction site is disclosed as is a unique trailer for moving the trees on a public road.

5 Claims, 10 Drawing Sheets

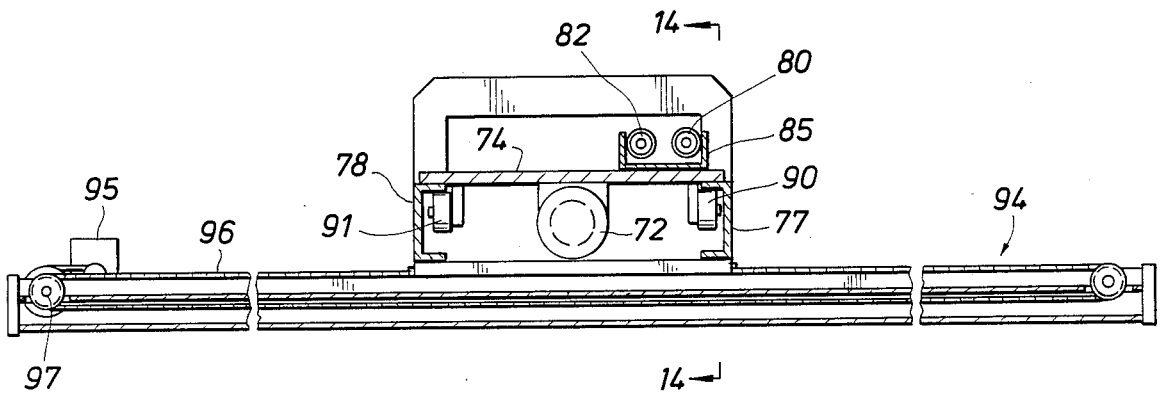
FIG.12
FIG.13
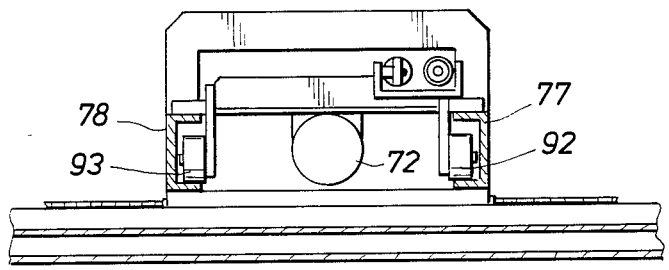
FIG.14
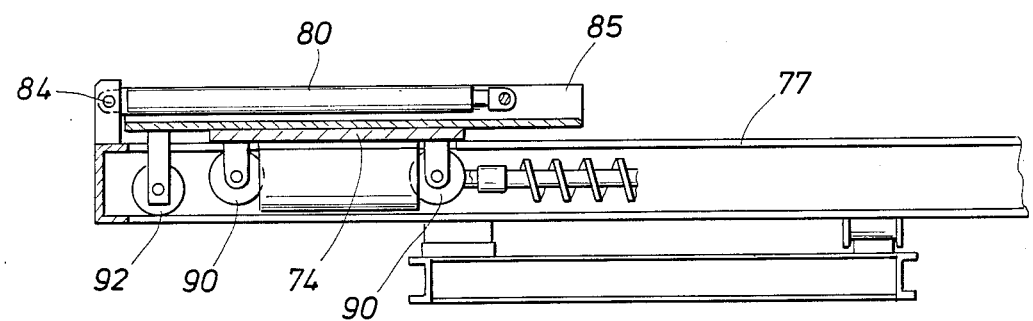

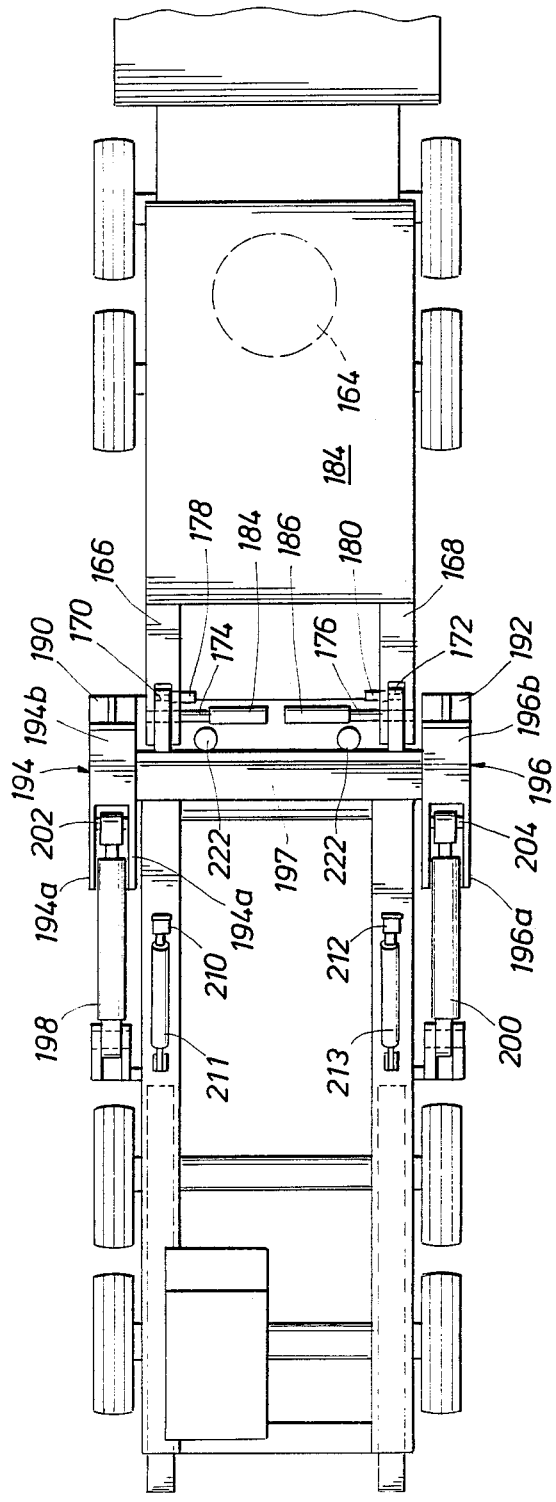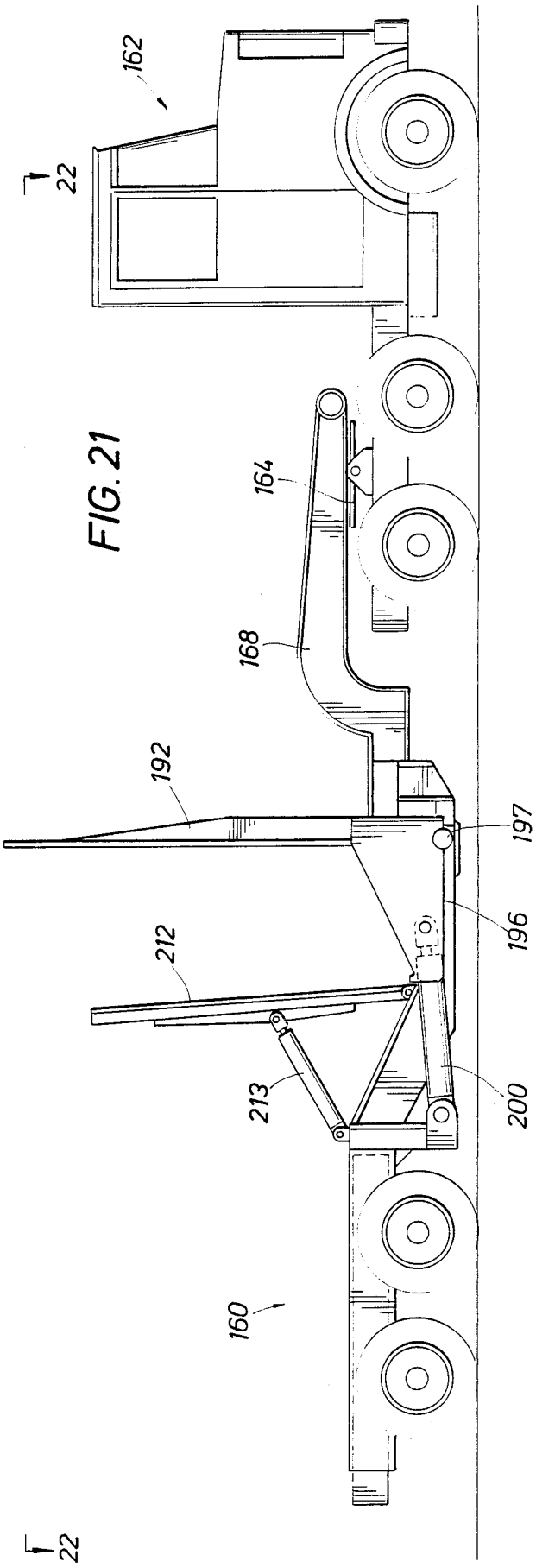

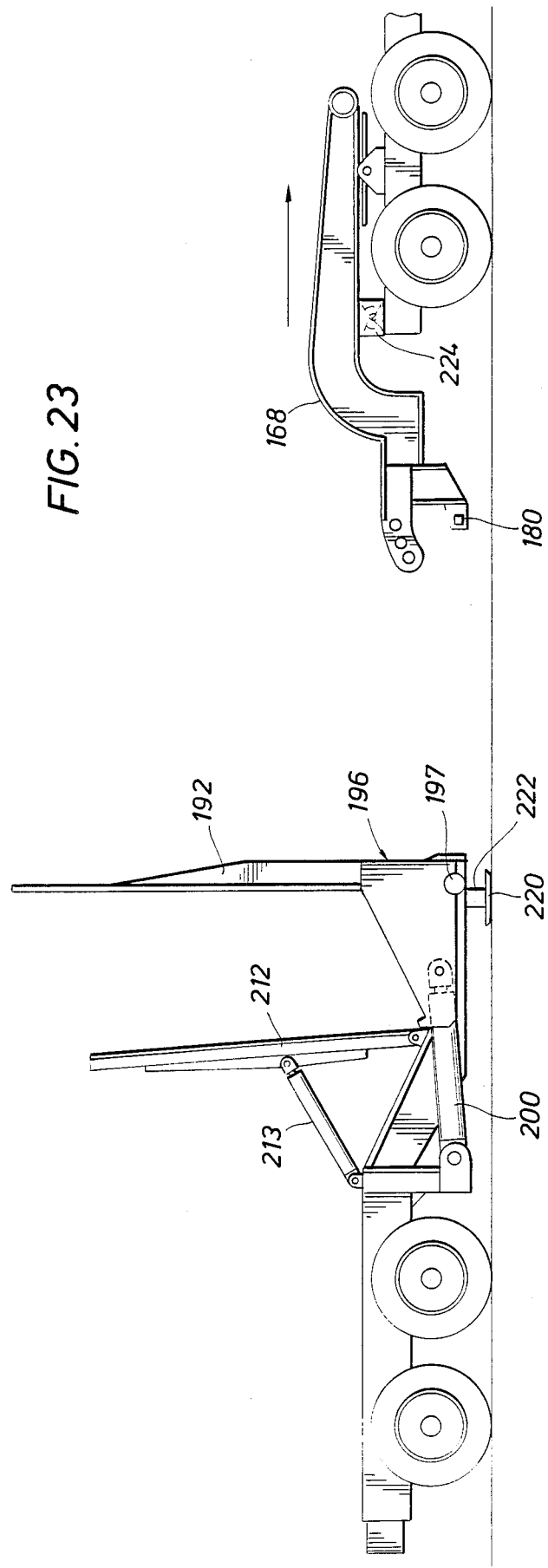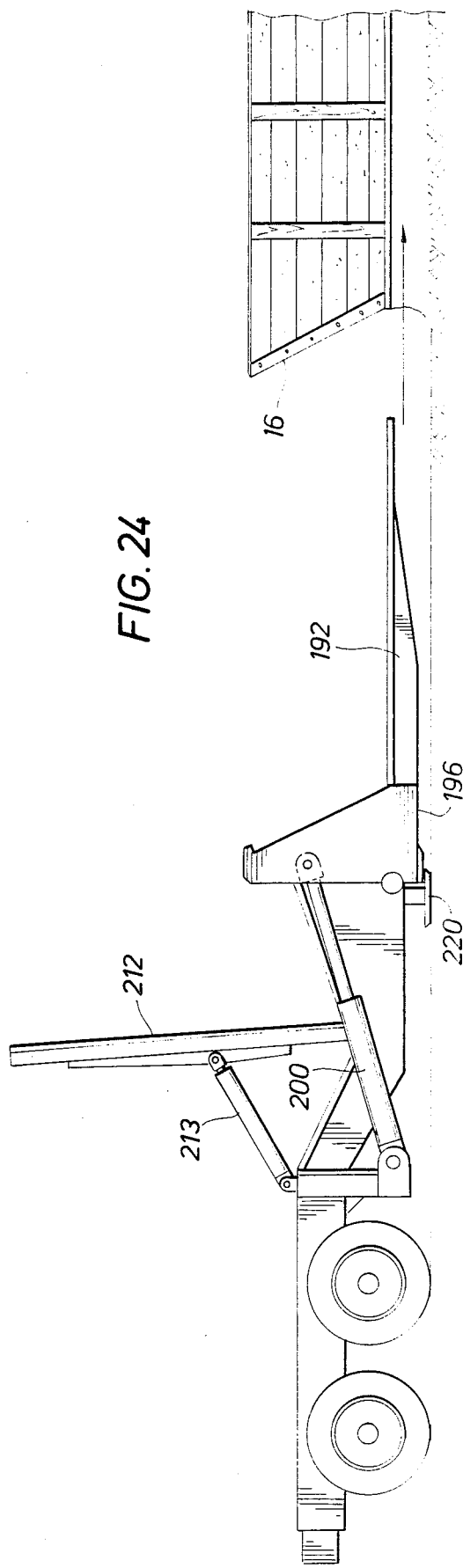

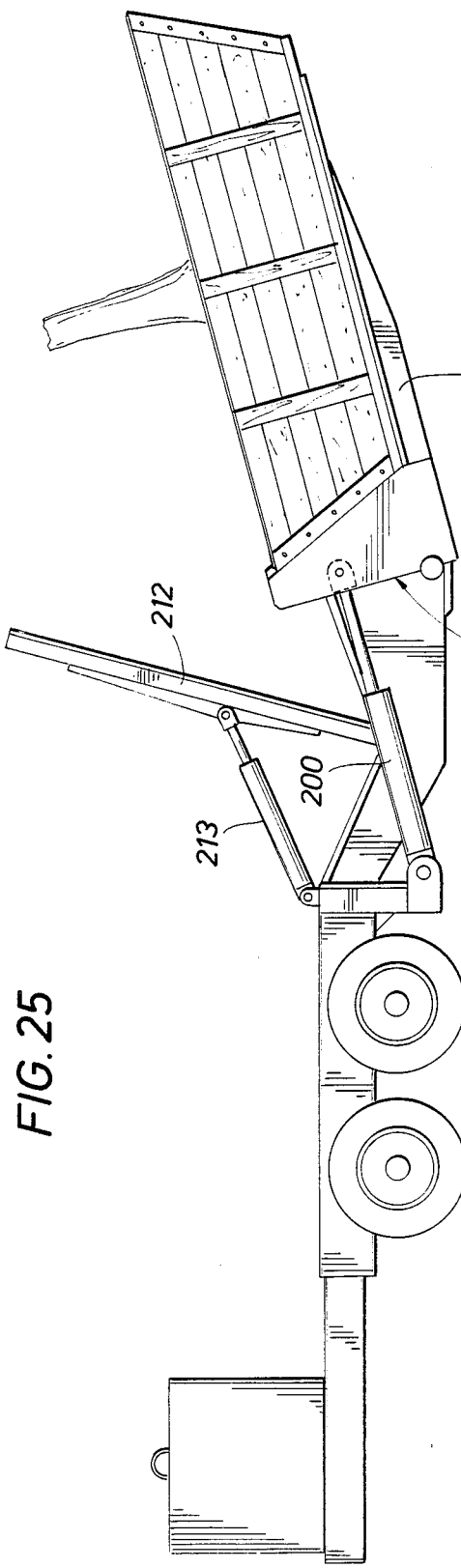
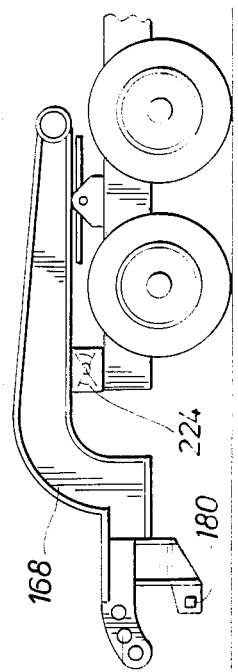
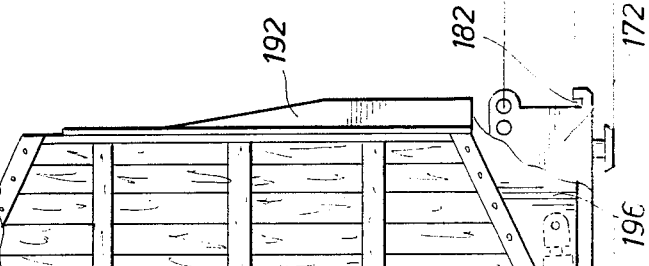
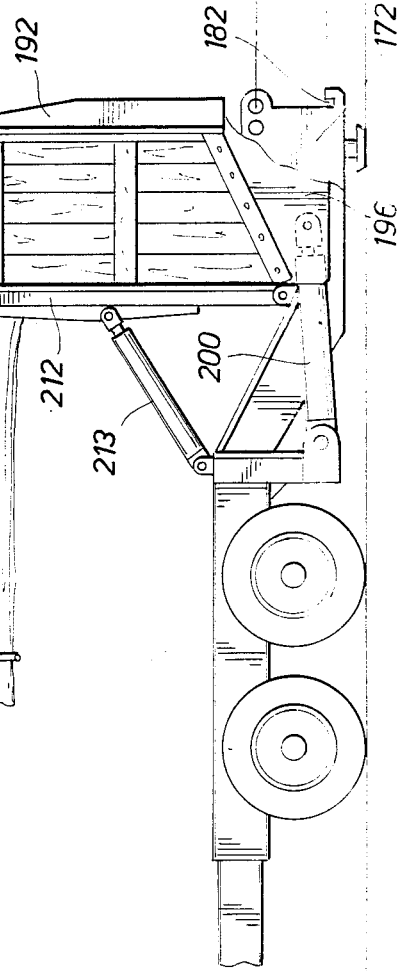

METHOD FOR TRANSPLANTING LARGE TREES

This invention relates to a method of and apparatus for transplanting large trees, such as trees 12" in diameter or above.

In one of its aspects, this invention relates to a method of enclosing the ball of soil to be moved with the tree in a rigid container. In yet another aspect, the invention relates to vehicles for moving the tree when the ball has been enclosed in such a container.

Until recently, developers of property, particularly commercial property, would clear the location of all the trees, large trees as well as small trees before the construction began with no thought given to whether or not the trees could in some way saved. Where a large and particularly desirable tree was located so that it would not be in the way of construction then it might be spared, but on the whole, the idea was to clear the location, build the building or buildings, and then come back and landscape around the buildings using young trees that could be transplanted with a high degree of success. Developers and architects working for the developers have now come to realize that large trees on a property to be developed are worth saving if at all possible. Usually the trees are not in the right place on the property and, therefore, to save them, it is necessary to relocate them so that they will not be in the way of construction and yet be there to form part of the landscape around the building when it is completed. One of the problems with this, however, is that moving such large trees was expensive, labor intensive, and the mortality rate of the trees was high. This was probably because it was very difficult to move these trees with a ball sufficient to support the tree in its new location without damaging the tree's feeder roots to the extent that the tree would die.

Therefore, it is an object of this invention to provide a method of and apparatus for moving large trees that reduces substantially the time and labor involved in moving such trees and that will maintain the ball moved with the tree substantially intact and undisturbed so as to give the tree an excellent chance of surviving the move.

It is a further object of this invention to provide such a method and apparatus that will sever a ball of soil from around the tree and enclose it in a rigid container that will hold the soil and roots from relative movement as the tree is being moved.

It is a further object of this invention to provide a method and apparatus for moving a tree lifted by applying lifting forces to the rigid container in which the ball being moved with the tree is contained and when the tree is moved in a horizontal position by rotating the container ninety degrees.

It is a further object and feature of this invention to provide a trailer for moving trees by picking up the tree by picking up a rigid container containing the ball of soil and roots severed from the ground with the tree rotating the container and tree about 90° so that the tree extends along the longitudinal axis of a trailer, supporting the container on its side on the trailer, and exerting a clamping force between the top and bottom of the container to hold the container and the tree in position on the trailer and to keep the soil in the container under a slight compressive force to ensure that it remains undisturbed while the tree is being moved to its new location where it will be rotated back 90° to its upright position, and placed in its new location.

It is a further object and advantage of this invention to provide a method and apparatus for severing a substantial portion of the soil around the tree to be transplanted and constructing a container around the soil in such a way that only a very small portion is unsupported for any length of time resulting in a minimal amount of disturbance between the soil and the roots of the tree located in the container.

It is a further object, advantage, and one of the features of this invention to provide such a method and apparatus in which a trench, usually rectangular in configuration and one that slopes inwardly toward the tree, is dug around the tree at a distance and depth from the tree sufficient to provide an ample ball to support the tree if it is well watered, building container walls around the inside wall of the trench to support the soil of the ball and prevent it from lateral movement, sequentially removing sections of the soil beneath the soil of the ball confined by the container walls, and replacing each section of soil as it is removed with a support member so that as the ball is severed from the earth, it will be at all times substantially always supported by either the earth before it is severed or the support members that are placed sequentially under the ball as the sections of the earth are removed. Once the ball is confined in the container, which at that time will consist of the container walls around the inner walls of the original trench and the support members that extend underneath the ball, the ball can be lifted upwardly by slings placed under the container and attached to whatever lifting device is convenient and moved in an upright position to another location on the property. At this time, it is not necessary to replant the tree. It can be kept alive and in good shape by simply keeping it well watered in the container. When the construction is completed, the tree can then be moved to the place it is to have in the landscape.

It is a further object and one of the features of this invention to provide a vehicle for moving the trees after the containers have been constructed around the ball of dirt and roots that can be located around the tree with lifting devices, such as hydraulic cylinders, positioned to exert substantially straight upward pulls on the slings looped around the bottom of the container so that the branches of the tree will be somewhat protected from damage that may result if a crane was used for this purpose and the slings would have to come together on the hook of the crane somewhere above the top of the tree. Another advantage is that this system does not place the weight of the soil in the ball on the roots in the ball.

These and other objects, advantages, and features of this invention will be apparent to those skilled in the art from a consideration of this specification, including the attached drawings and appended claims.

IN THE DRAWINGS

FIG. 12 is a view taken along line 12—12 of FIG. 10.

FIG. 13 is a sectional view taken along line 13—13 of FIG. 10.

FIG. 14 is a sectional view taken along line 14—14 of FIG. 12.

FIG. 21 is a side view of a trailer uniquely designed to handle large trees having the ball of soil being moved with the trees enclosed in a rigid container.

FIG. 22 is a view looking in the direction of the arrows 22 in FIG. 21.

FIG. 23 is a side view of the trailer with the draw bar and fifth wheel removed to position the trailer for picking up the tree for movement to another location.

FIG. 24 is a side view showing the trailer in position to move the arms used to pick up the tree underneath the container.

FIG. 25 is a side view of the trailer as it is beginning to rotate the tree to position it on the trailer with the container laying on its side and the tree extending along the longitudinal axis of the trailer or is rotating the container 90° to place it on the ground.

FIG. 26 is a side view of the container on the trailer and the draw bars being moved back into position to connect to the trailer for moving the trailer and the tree to another location.

When transplanting a tree, a portion of the soil around the tree and the roots of the tree located in this soil are dug up along with the tree so that at least a portion of the root system of the tree will be intact in the tree's new location. This was called a root ball or simply a "ball" as in "balled and burlapped" trees ready for transplanting. In the practice of this invention, the portion of the soil and roots removed with the tree will not be ball-shaped, but for the sake of convention it will be called a "ball" or "root ball" in this specification.

It is one of the features of this invention to provide a method for severing the root ball from the ground during the practice of which only a small portion of the ball is unsupported at any given time and then for only short periods of time so that the soil and the roots in the soil will be substantially undisturbed by the severing of the root ball. Further, at the time the root ball is completely severed, it will be confined in a rigid container that will prevent substantially all relative movement of the roots and soil in the root ball. This is very important because such movement tends to break the very fine feeder roots that are so very critical to the survival of the tree in its new location.

Figure 1:
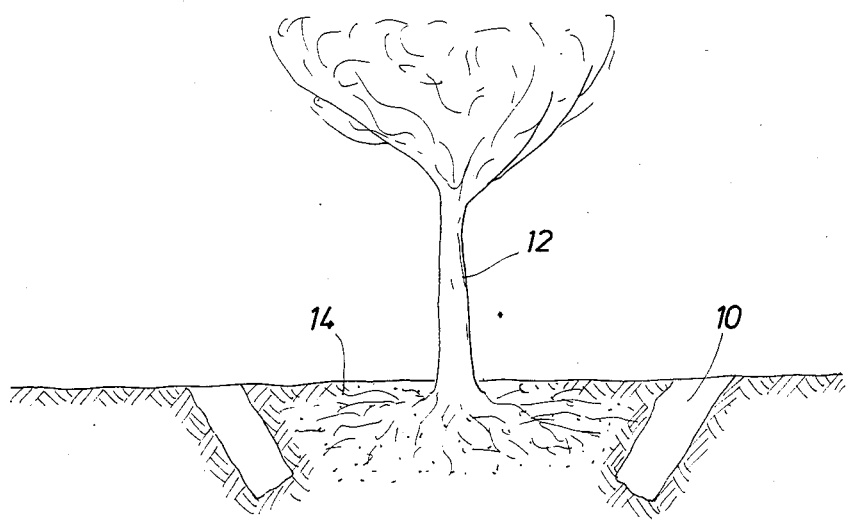
FIGS. 1-4 are vertical sectional views through the ground around a tree showing the steps in the practice of the method of this invention required to enclose the ball of soil to be moved with the tree in a rigid container.
Figure 2:
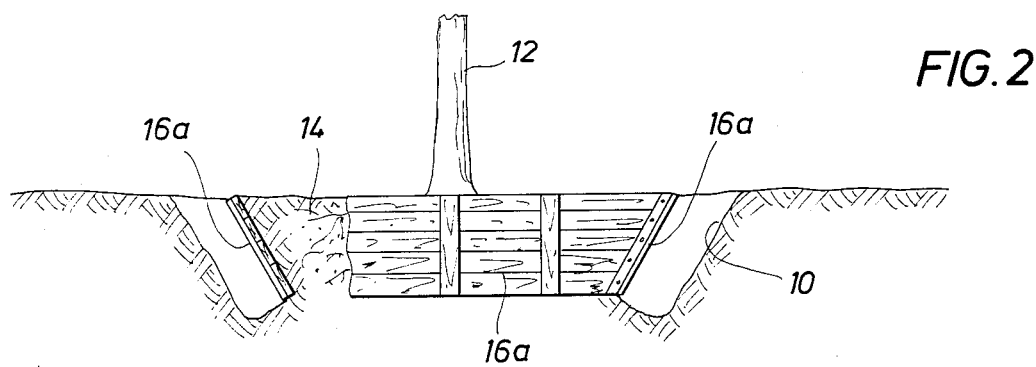

The first step of the method is to cut trench 10 around tree 12 to be transplanted. In the embodiment shown, the trench is dug at an angle to the vertical so that it slopes inwardly toward the tree from the surface of the ground. Also in the embodiment shown, the trench is substantially square and the root ball 14 is shaped like an inverted truncated pyramid. After the trench has been dug to a depth and at a distance from the tree sufficient to provide a root ball sufficient to sustain the tree after it has been removed from the ground, side walls 16a of container 16 are connected together in engagement with the inner wall of the trench, as shown in FIG. 2. Preferably, the length of the container walls are such that the ball is placed slightly in compression to hold the roots and the soil from relative movement as the ball and tree are moved.

Figure 3:
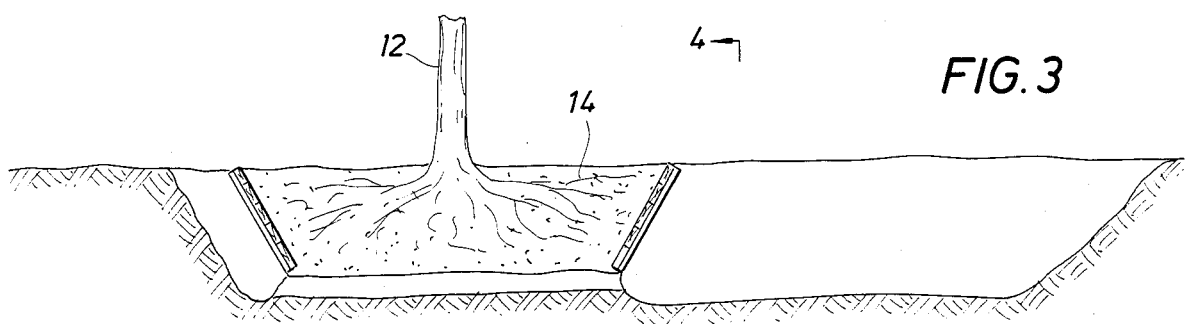
Figure 4:
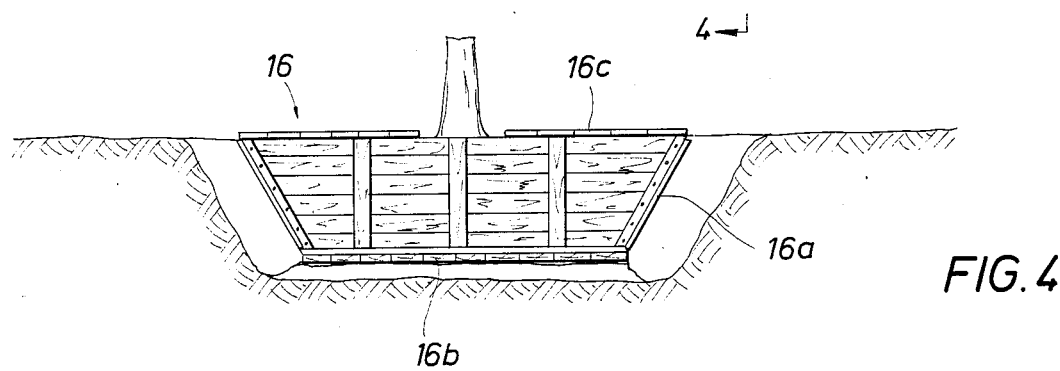
Figure 5:
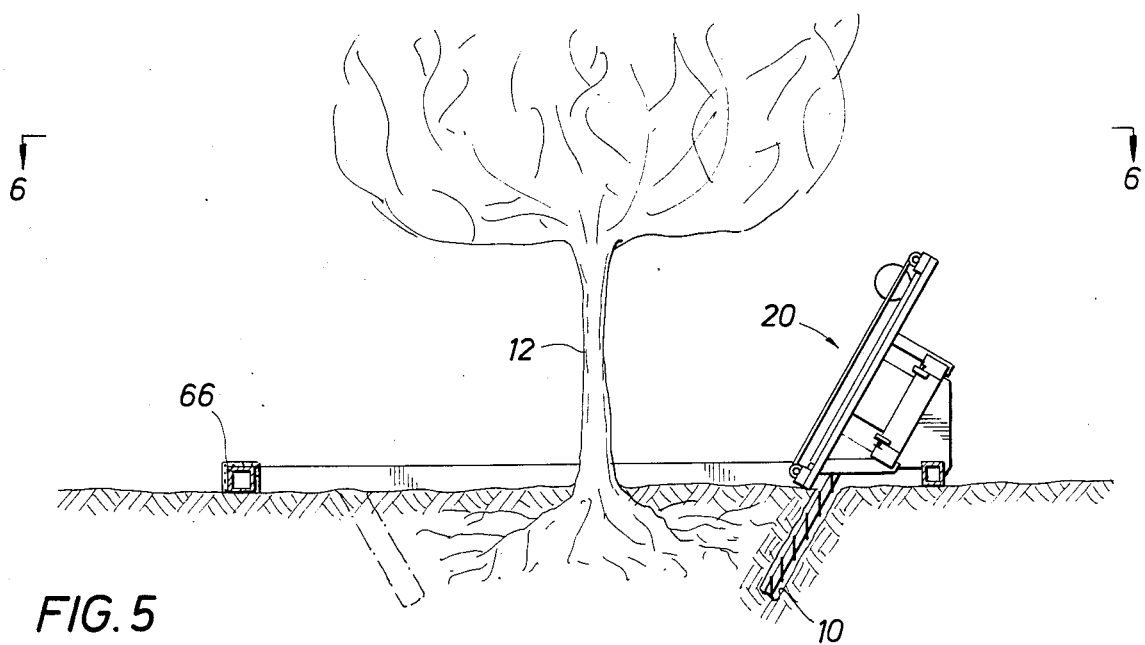
FIG. 5 is a side view of the apparatus used to dig the trench around the tree to a depth and at a distance from the tree sufficient to keep the tree in good health while living in the container.

After side walls 16a of the container are in place and connected to each other at the corners to confine the soil in ball 14 from lateral movement, ball 14 is next severed from the ground along a horizontal plane below the side walls, as shown in FIG. 3. This is done in accordance with this invention by removing only small sections of the soil below ball 14 at any one time and, as each section is removed, it is replaced by a support member 16b, consisting of large heavy timbers that will form the bottom of container 16 when all of the dirt below the container has been removed and replaced by support members. In FIG. 4 all the support members are in place below the ball. In addition, the top of the container and ball 14 have been covered timbers 16c to totally confine the soil in the ball in a rigid container that is strong enough to take the forces imposed thereon as the tree is lifted and moved by raising, lowering, and rotating the container itself.

The apparatus for digging trench 10 is shown in FIGS. 5-8. It includes trenching machine 20 that includes chain 22 that passes over idler 24 at the lower end and over a sprocket attached to the output shaft of a hydraulic drive motor (not shown) in housing 26 at the upper end. Cutting blades 28 are carried by the chain and are designed to cut a trench in the ground as the machine is moved from left to right as viewed in FIG. 8. The machine is mounted on frame 30, which is supported by spaced parallel rails 32 and 34 by mounting arms 36 and 38 that support the trenching machine and that also slides along rails 32 and 34. Hydraulic motor 39 drives sprocket 40 on the output shaft of the motor and sprocket 42 located on shaft 44a through drive chain 46. Roller chains 46 and 48 each have one end connected to the top of movable frame 50, on which the trenching machine is mounted. The other end of each chain is connected to the bottom of the frame. The chains engage sprockets on upper shaft 44a and lower shaft 44b so that hydraulic motor 39 can raise and lower frame 50 and the cutting blades by rotating sprocket 40 in one direction or the other.

Figure 6:
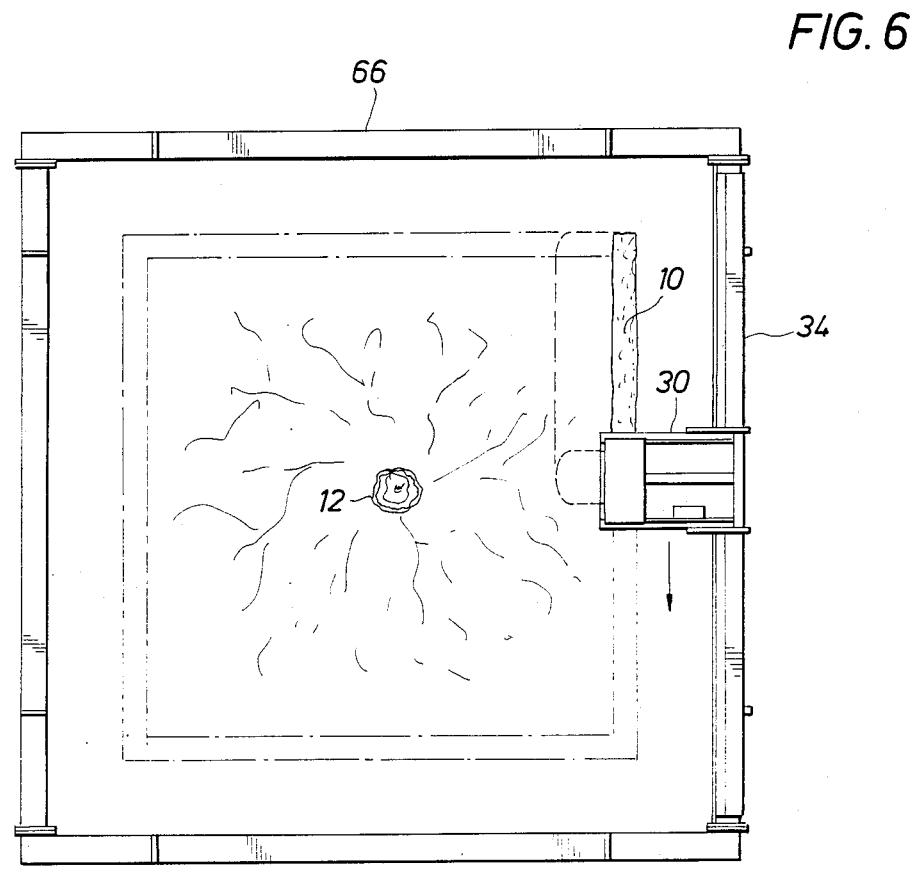
FIG. 6 is a view looking in the direction of the arrows 6—6 in FIG. 5.
Figure 7:
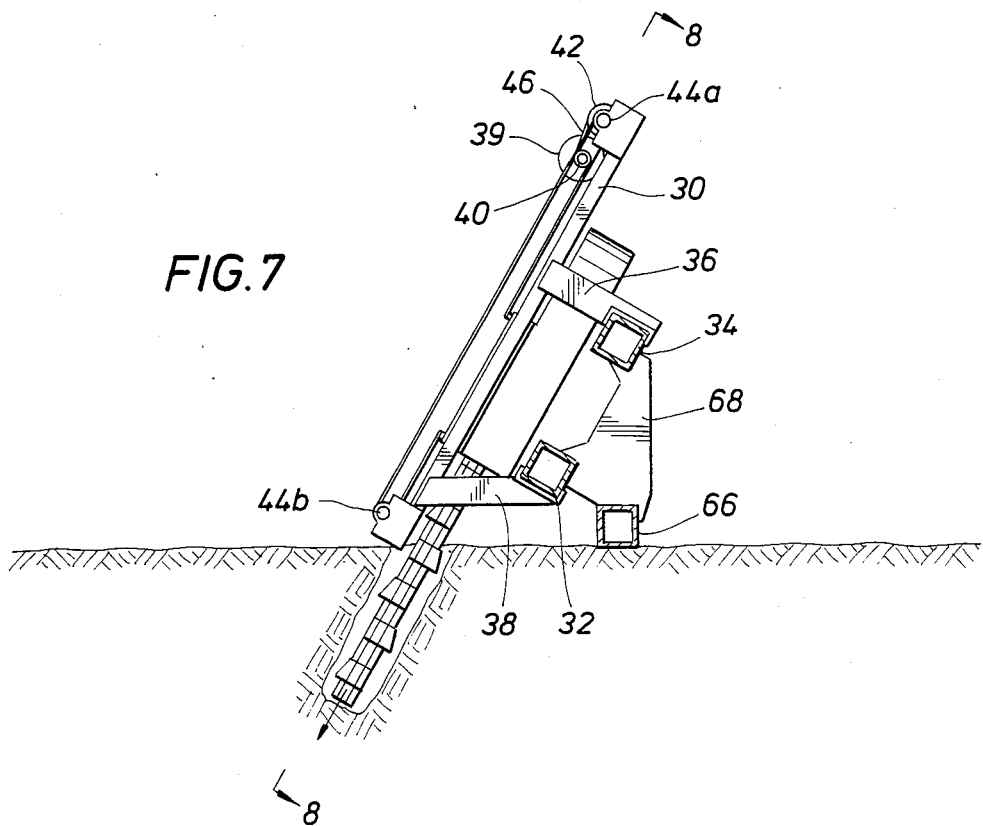
FIG. 7 is a side view, on an enlarged scale, of the trenching apparatus.
Figure 8:
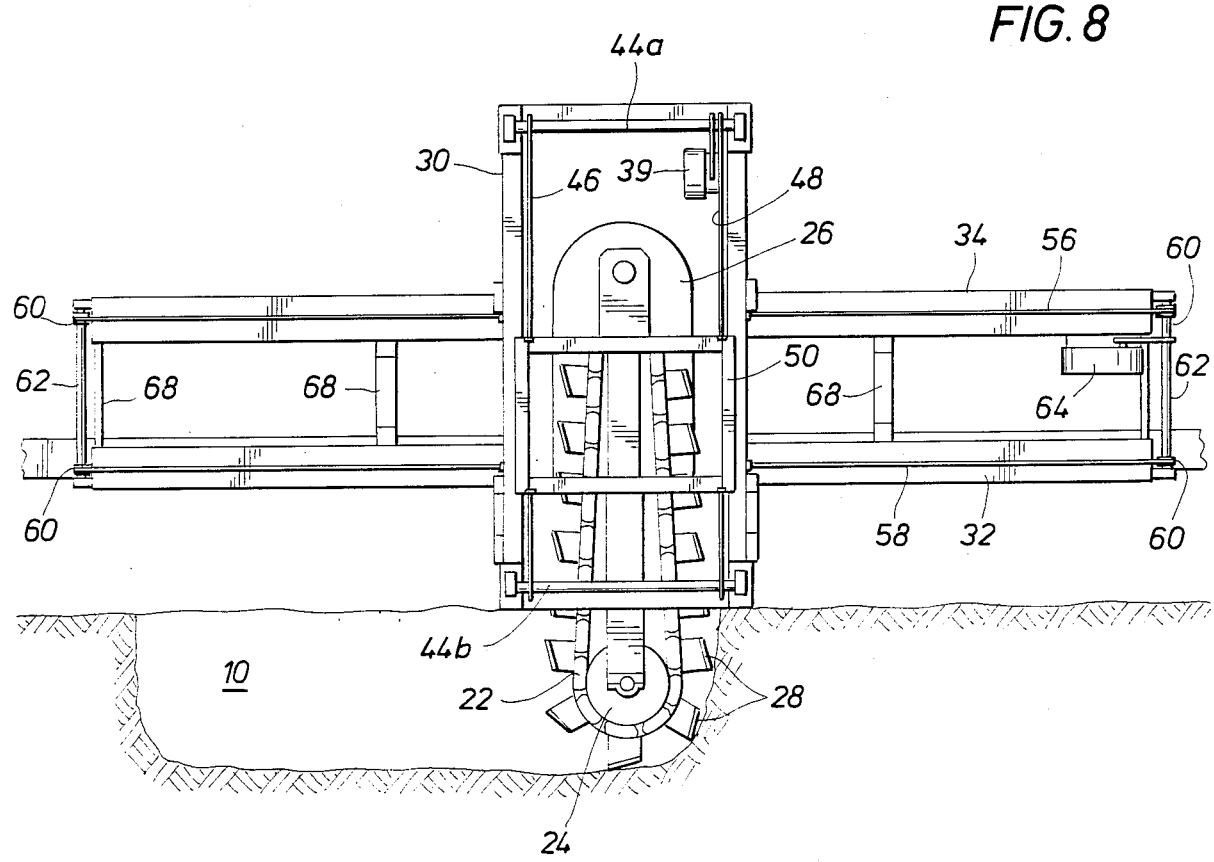
FIG. 8 is a view looking in the direction of the arrows 8—8 of FIG. 7.

Frame 30, in turn, is moved along rails 32 and 34 by chains 56 and 58. The ends of the chains are connected to opposite sides of frame 30, as viewed in FIG. 8. The chains pass over sprockets 60 on shafts 62 at opposite ends of the rails and by rotating this shaft with hydraulic motor 64, frame 30 can be moved to the right or left as required to cut ditch 10 along the length of rails 32 and 34. The rails are supported on template 66 by support plates 68. The template lays on the ground around the tree to provide the pattern for the trench. In practice, the trenching machine assembly is placed on one section of the template, such as the right-hand side as shown in FIG. 6, where it cuts a trench parallel to that section of the template. It is then picked up and moved to another section of the template, cuts another portion of the trench and so on. The templates will come in various sizes depending upon the diameter of the tree. This also allows the sides of the container to be prefabricated and the bottom and top timbers to be precut to the proper length to form the top and bottom of the container.

Figure 9:
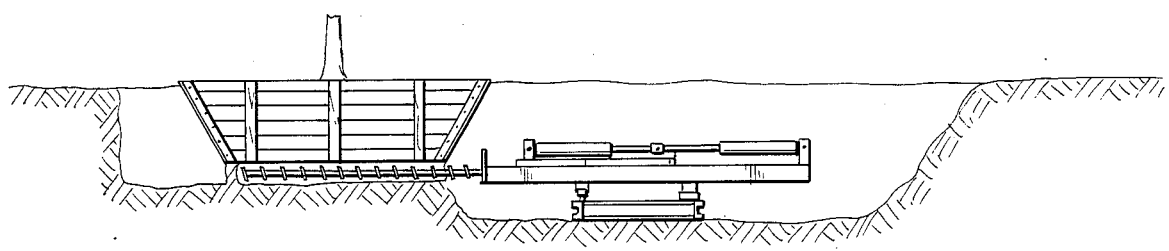
FIG. 9 is a side view of the auger used to remove the earth from beneath the portion of the soil held from lateral movement by the container walls.

FIGS. 9-14 illustrate the auger machine used to remove the dirt from underneath the ball section by section to allow the support for the ball to be transferred in steps from the ground to the support beams or timbers that are placed under the ball and form the bottom of the container. To accommodate the auger machine, one side trench 10 must be enlarged as shown in FIGS. 3 and 9 so that the auger machine can be positioned to remove dirt from beneath the ball already confined in the side walls of the container. When positioned as shown in FIG. 9, auger 70 can be moved longitudinally in a horizontal plane to remove soil from one side of the ball to the other. Usually the timbers to be placed underneath the ball are such that the auger will make several parallel passes before enough dirt is removed to accommodate one timer. For example, if the timbers are $4 \times 12$ and the auger is 4" in diameter, then three passes by the auger is required before the timber could be installed.

Figure 10:
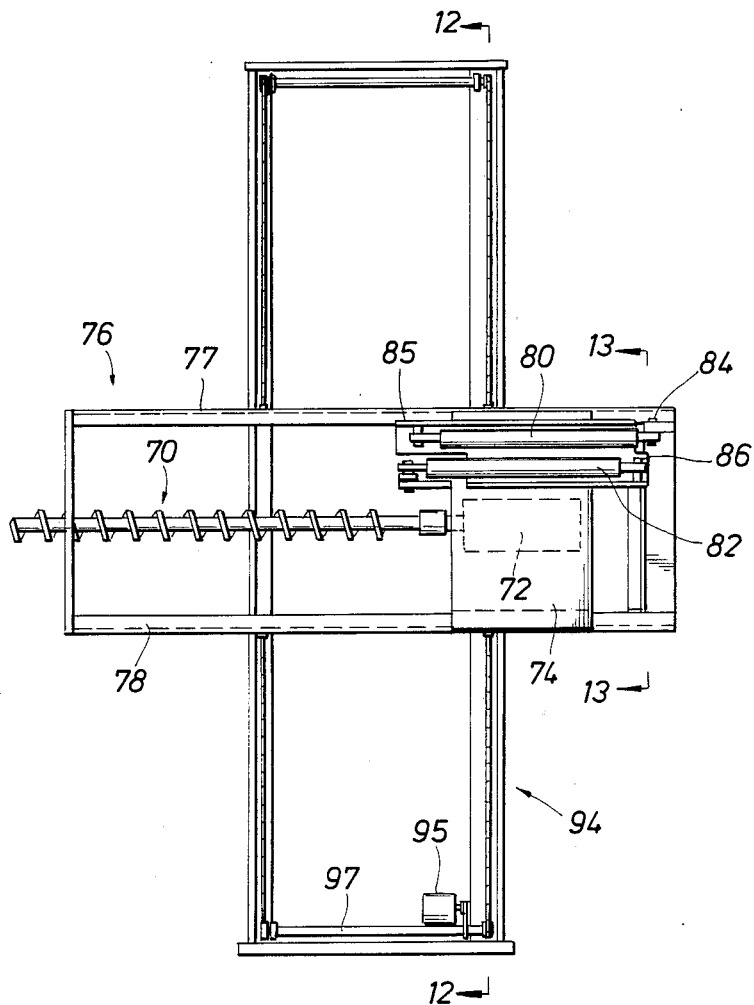
FIG. 10 is a top view of the retracted auger and the apparatus for moving the auger longitudinally and laterally.
Figure 11:
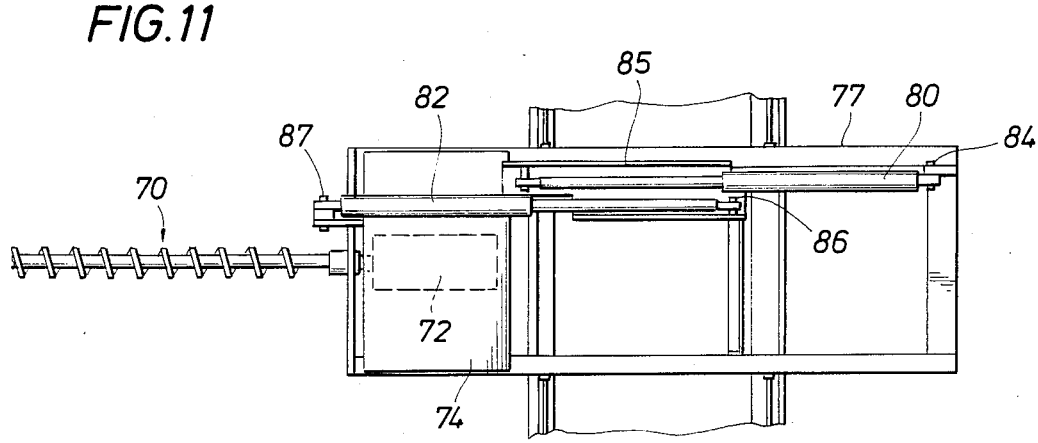
FIG. 11 shows the auger in its most extended position.

Auger 70 is driven by hydraulic motor 72 that is mounted on plate 74. The plate is supported by rectangular frame 76 that includes parallel guide rails 77 and 78. Plate 74 with motor 72 can slide along rails 77 and 78 and move the auger back and forth underneath the ball. In the embodiment shown, this is accomplished by hydraulic cylinders 80 and 82. In order to get the benefit of the full stroke of both cylinders, cylinder 80 is attached to the right-hand end of the frame by pin 84 as shown in FIG. 10. The rod of cylinder 80 is attached to plate 85 which in turn is attached to the rod end of cylinder 82 by pin 86. Cylinder 82 is connected to plate 74 by pin 87. In operation then, at the beginning of the stroke, the position of the rods and cylinders will be as shown in FIG. 10. Cylinder 80 will first extend its rod to its fullest length, moving plate 85 to the position shown in FIG. 11. Subsequently, cylinder 82 will be extended to the position shown also in FIG. 11 so that the full stroke of the two cylinders will be used to move the auger back and forth beneath the container.

As shown in FIGS. 12-14, plate 74 is held on top of rails 77 and 78 by rollers 90 and 91. Rollers 90 run along the upper flange of rail 77 whereas rollers 91 engage the upper flange of rail 78. Plate 85 is supported above plate 74 by rollers 92 and 93 that roll along the lower flange of rails 77 and 78.

Frame 76, on which the auger machine is mounted, is moved back and forth along frame 94 by hydraulic motor 95 driving roller chains 96 that are connected to opposite sides of frame 76. The motor drive rotates shaft 97 that in turn moves the roller chains to move frame 76 in the desired direction along frame 94.

A unique vehicle for moving large trees, where it is not necessary to get on a public highway, is shown in FIGS. 15-20. For example, this vehicle that would be ideal for use in rearranging large trees on a building site before construction begins or for moving large trees, after they have been severed from the ground in accordance with the method of this invention, to an out of the way place on the grounds where they can live until the building is completed when they can be replanted and be part of the landscape.

The vehicle includes a framework made up of spaced, parallel, horizontal, members 100 and 102 and parallel transverse members 104 and 106. The framework is supported above the ground at the rear of the vehicle by vertical members 108 and 110 which are supported by dual wheel assemblies 112 and 114. The front of the framework is supported by similar vertical support members 116 and 118. The front support columns are mounted on powered wheel assemblies 120 and 122 that include motor 124 and 126, respectively, that drive the wheels and move the vehicle over the ground. Front support columns 116 and 118 are mounted on the powered wheel assemblies so that the tractors can pivot around a vertical axis relative to the framework as required to turn the vehicle in one direction or the other.

Extending between beams 104 and 106 of the framework are two pairs 128 and 130 of spaced beams. Hydraulic cylinders 132 and 134 are mounted on the pair 128 and cylinders 136 and 138 are mounted on pair 130. The cylinders are mounted and the beams are spaced for the cylinder rods to extend downwardly between the support beams. The cylinders are mounted to be substantially vertical so that the rods are in substantially vertical alignment with the upper ends of slings 140-142, that extend under container 14 so there will be a minimum of side loading on the cylinders as the cylinder rods lift container 14 and the tree out of the ground.

Since the size of the container will vary with the size of the tree, it is presently expected that the size of the containers will vary from $12' \times 12'$ up to $20' \times 20'$. The $12' \times 12'$ container will be used for trees in the 12" to 18" diameter range and the $20' \times 20'$ will be used for trees 30" to 35" or more inches in diameter. The ball in the $12' \times 12'$ container will weigh approximately 51,000 lbs. The $20' \times 20'$ will contain a ball that weighs approximately 230,000 lbs.

To adapt the vehicle for various size containers so that the upward pull on the slings exerted by the cylinders is substantially vertical, support members 104 and 106 are provided with removable center sections 104a and 106a. This allows the transverse distance between the cylinders to be adjusted by changing the length of the removable sections. The distance between the cylinders along the longitudinal axis of the vehicle does not need to be varied since the distance between the slings would be adequate for any of the containers to be lifted.

To ensure that the pull exerted by the cylinders is in line with the slings, the cylinders are mounted on the support beams so that they can pivot slightly in all directions. This is accomplished by supporting each cylinder in a collar, such as collar 144 shown in FIG. 18. The collar has trunnions 146 located on opposite sides that in this embodiment extend along the longitudinal axis of the vehicle. The trunnions are mounted for rotation around their longitudinal axis in supporting block 148 that, in turn, is provided with trunnions 150 on opposite sides that are supported by support plates 152 that are attached to the top of support beams 128 and 130 as the case may be.

Figure 15:
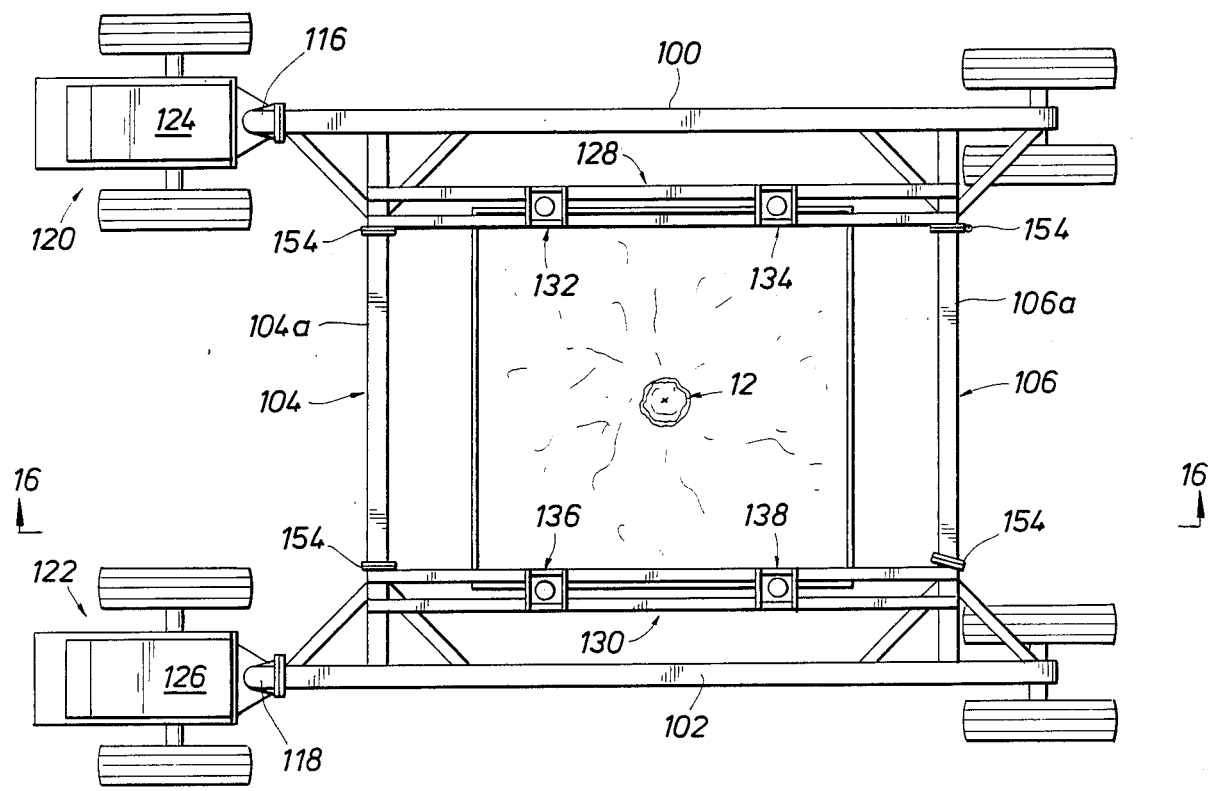
FIG. 15 is a top view of a vehicle designed for moving large trees by lifting substantially vertically on the container in which the ball of dirt accompanying the tree is located.
Figure 16:
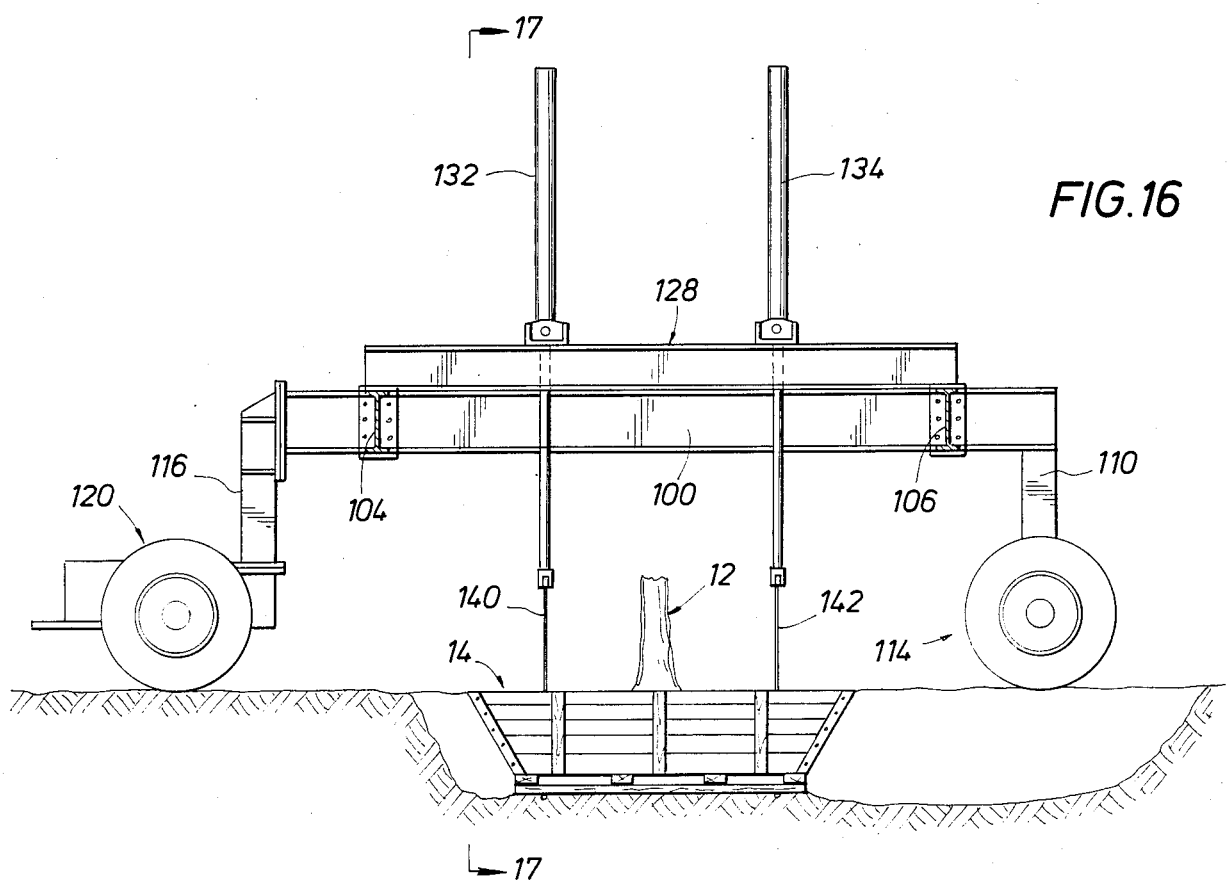
FIG. 16 is a sectional view taken along line 16—16 of FIG. 15 showing it in position to lift a container and the tree vertically for movement to another location.
Figure 17:
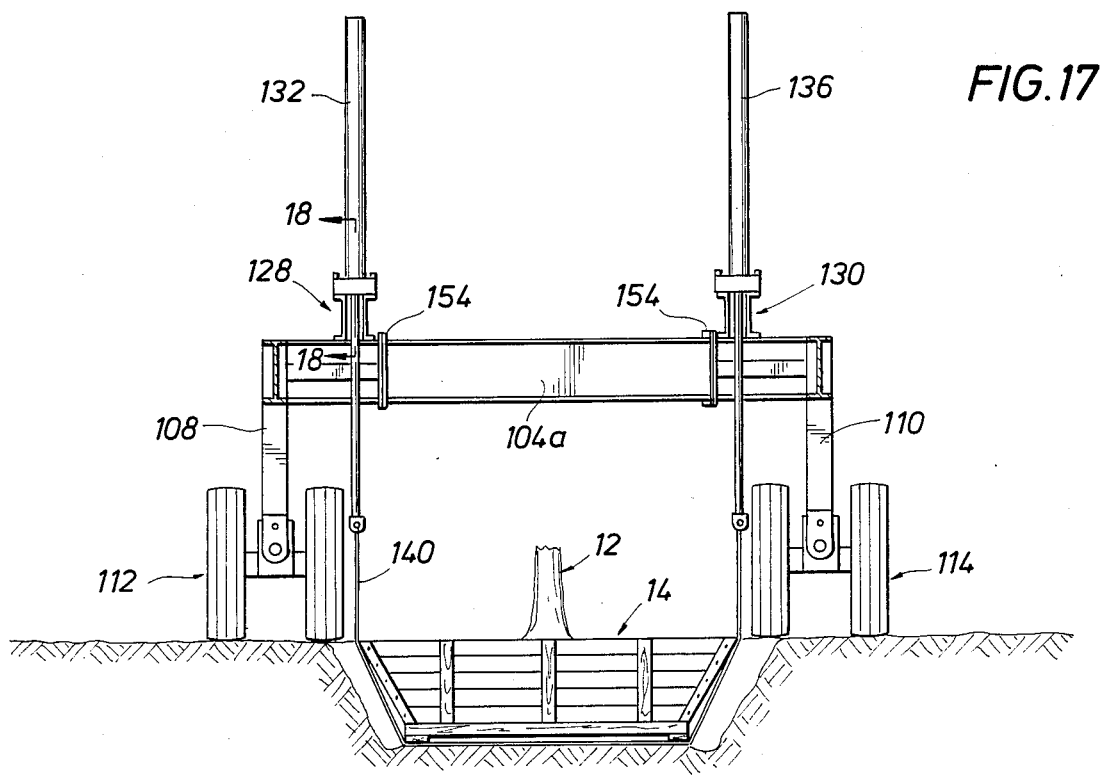
FIG. 17 is a sectional view taken along line 17—17 of FIG. 16.
Figure 18:
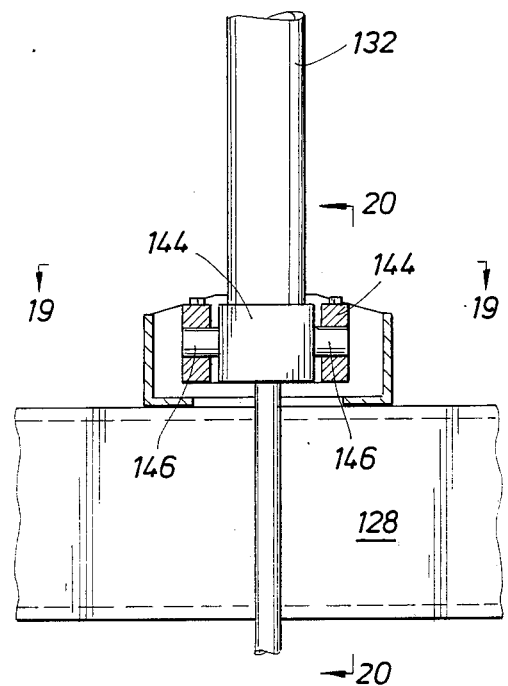
FIG. 18 is a sectional view taken along line 18—18 of FIG. 17 showing the universal mounting of the hydraulic cylinders on the vehicle.
Figure 19:
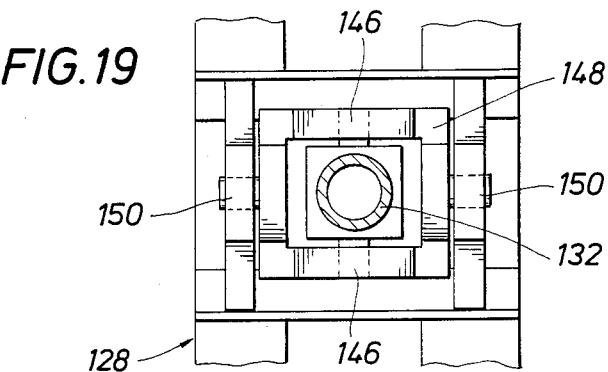
FIG. 19 is a sectional view taken along line 19—19 of FIG. 18.
Figure 20:
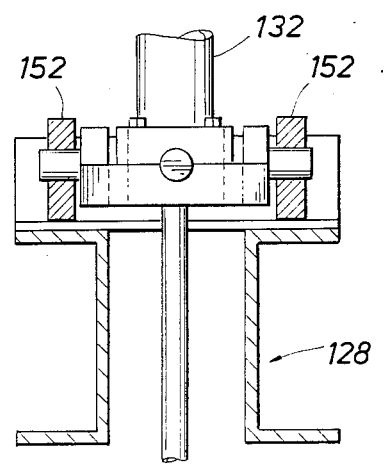
FIG. 20 is a sectional view taken along line 20—20 of FIG. 18.

In operation, one of the removable sections of transverse beams 104 and 106 is removed to allow the trunk of the tree to pass into the center of the framework of the vehicle as shown in FIG. 15. The removable section is replaced. The slings are attached to the cylinder rods and the container will be lifted straight up carrying the ball and the tree with it. The vehicle only needs to lift the container far enough for it to clear the ground, then it can proceed to move the tree to wherever it is to be located.

The removable sections 104a and 106a are connected to and removed from beams 104 and 106 by flanges 154. The length of the permanent portions of beams 104 and 106 is such that they can be connected together and the width of the vehicle will be such that it can travel down a public road.

FIGS. 21-26 show a unique trailer that can be used for moving trees, which are prepared for transplant in accordance with the method of this invention, along a highway. FIG. 21 is a side view of such a trailer, generally indicated by the number 160, attached to tractor 162 by fifth wheel 164. The fifth wheel is connected to the trailer proper by a pair of spaced gooseneck hitch members 166 and 168. As best seen in FIGS. 22 and 26, FIG. 22 being a view from above the trailer and tractor, hitch members 166 and 168 are connected to the trailer through hitch plates 170 and 172 that are connected to the trailer. The hitch plates extend into slots in the ends of the hitch members. They are connected to the hitch members by pins 174 and 176 that extend through aligned openings in the hitch members and the plates. Also connecting the hitch members to the plates are square pins 178 and 180 that engage notches 182, only one of which is shown, that are located in the front edge of the plates close to the lower edge. Square pins 178 and 180 prevent any relative rotation between the hitch members and the back of the trailer around pins 174 and 176. Hitch members 166 and 168 are connected by plate 184 and it is to this plate that the fifth wheel is attached. Pins 174 and 176 are moved into and out of the openings in the hitch members and the hitch plates by double-acting fluid cylinders 184 and 186.

Support arms 190 and 192 are attached to container support members 194 and 196. The support members are constructed of side plates 194a and 196a and top plates 194b and 196b that are welded together to provide two inclined flat surfaces provided by top plates 194b and 196b for supporting the container as it lays on its side on the trailer as shown in FIG. 26. The support members are mounted for rotation around shaft 197. Fluid powered cylinders 198 and 200 have one end connected to the trailer and the rod end connected to support members 194 and 196 through pins 202 and 204 to pivot arms 190 and 192 between a substantially vertical position, as shown in FIG. 21, to a substantially horizontal position, shown in FIG. 24.

A second pair of arms 210 and 212 are mounted on the trailer behind the front pair of arms. These arms are moved between a substantially vertical position to a forward inclined position, as shown in FIG. 25. In this position the arms can engage the top of the container as it is being pivoted to a vertical position to keep the container from sliding down the inclined surfaces of the support members.

In operation, the trailer is moved to a position adjacent to a tree that has been severed from the ground and the ball of the tree confined in container. A pair of shoes 220 are lowered into engagement with the ground by fluid cylinders 222. A support block 224 is placed between the bed of the tractor and the hitch members to keep them from pivoting downwardly when they are disconnected from the trailer. Fluid cylinders 184 and 186 then move pins 174 and 176 out of the openings in the hitch members and hitch plates. The rear portion of the trailer is then lowered by cylinders 222 to move notches 182 out of engagement with square pins 178 and 180. The tractor can now move the hitch portion of the trailer out of the way. The front of the trailer is supported at this point by shoe 220.

The trailer is positioned so that when arms 190 and 192 are lowered to the horizontal position by cylinders 198 and 200 as shown in FIG. 24, the trailer can move forward and the arms will move underneath container 16. The ball in the container and the tree have been previously lifted from the ground and placed on blocks above the ground so that the arms can easily move under the container. Hydraulic cylinders 198 and 200 then begin rotating arms 190 and 192 and container support members 194 and 196 back to their vertical position, as shown in FIG. 25. At this same time, arms 210 and 212 are moved forwardly by cylinders 211 and 213 so that they will engage the top of the container before the container reaches the point where it might begin to slide down the surfaces of support members 194 and 196. As the first pair of arms continue to rotate the container to a vertical position as shown in FIG. 26, arms 210 and 212 move back toward their original vertical position while clamping the container between these arms and lifting arms 190 and 192.

Some sort of support is usually provided between the container and the tree to keep the bending moment imposed on the trunk of the tree by the weight of the branches of the tree from being excessive. This can be done by extending line 226 from the trunk of the tree to the top of the container as shown in FIG. 26.

The hitch members are then reconnected to the trailer. First, the tractor moves hitch members 166 and 168 back in position where cylinder 222 can raise the front of the trailer upwardly until square pins 178 and 180 engage grooves 182 in the hitch plates. When this is done, cylinder 222 raises the hitch plates upwardly until whichever one of the openings in the plates and the hitch members are in alignment. Cylinders 184 and 186 can then move pins 178 and 180 through the openings in the hitch members and the hitch plate and support block 224 is removed. The tree is then moved down the highway, to where it is replanted or stored in the container until the property site is ready for the tree to be replanted. There the process will be reversed with the tree being rotated 90° back to the vertical position.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A method of moving large trees comprising digging a trench around the tree at a depth and distance from the trunk of the tree to provide a ball large enough to sustain the tree after it is moved, placing the walls of a container in the trench in engagement with the inside wall of the trench to hold the soil in place between the tree and the trench, enlarging the trench along one side away from the tree to the depth of the trench and for a distance from the inside wall of the trench equal to or greater than the distance between the bottom of the trench on the side the soil is removed to the bottom of the trench on the other side of the tree, removing the soil from under the tree and the container walls in short sections that extend from the enlarged side of the trench to the other, and positioning support members in the space created by the removal of the sections of soil until the soil in the box is substantially severed from the earth and rests on the support members, lifting the tree and the container, including the side walls and the support members, out of the remaining hole for planting elsewhere.

2. The method of claim 1 in which the container is slightly smaller in width than the distance between the inner walls of the trench to slightly compress the soil in the box.

3. The method of claim 1 in which the trench around the tree is rectangular and the sides slope downwardly toward the tree to form a ball in the shape of an inverted, truncated, pyramid.

4. The method of claim 1 including the further steps of closing the top of the container to hold the soil in the box when the box is tilted, rotating the container and the tree about 90° to lay the box on its side on a trailer, hauling the trailer to the desired location, and rotating the container and the tree about 90° to return the tree to an upright position, and placing the container in a hole prepared to receive it.

5. The method of claim 4 further including the step of clamping the top and bottom of the container between vertical arms when it is lying on its side to hold it in that position on the trailer.

* * * * *